H. D. COLMAN.
WINDER.
APPLICATION FILED DEC. 22, 1909.

1,105,065.

Patented July 28, 1914.
9 SHEETS—SHEET 3.

Fig. 3

Witnesses:
J. C. Devick.
George L. Chindahl

Inventor:
Howard D. Colman
By Luther L. Miller
Attorney

H. D. COLMAN.
WINDER.
APPLICATION FILED DEC. 22, 1909.

1,105,065.

Patented July 28, 1914.
9 SHEETS—SHEET 4.

Witnesses:
J. C. Devick.
George L. Chindahl

Inventor:
Howard D. Colman
By Luther L. Miller
Attorney.

H. D. COLMAN.
WINDER.
APPLICATION FILED DEC. 22, 1909.

1,105,065.

Patented July 28, 1914.
9 SHEETS—SHEET 5.

Witnesses:
J. C. Devick.
Geo. L. Chindahl

Inventor:
Howard D. Colman
By Luther L. Miller
Attorney

H. D. COLMAN.
WINDER.
APPLICATION FILED DEC. 22, 1909.

1,105,065.

Patented July 28, 1914.
9 SHEETS—SHEET 8.

Witnesses:
J. C. Derick.
George L. Chirdahl

Inventor:
Howard D. Colman
By Luther L. Miller
Attorney.

H. D. COLMAN.
WINDER.
APPLICATION FILED DEC. 22, 1909.

1,105,065.

Patented July 28, 1914.
9 SHEETS—SHEET 9.

Witnesses:
J. C. Devick.
George L. Chindahl

Inventor:
Howard D. Colman
By Luther L. Miller
Attorney.

UNITED STATES PATENT OFFICE.

HOWARD D. COLMAN, OF ROCKFORD, ILLINOIS, ASSIGNOR TO HOWARD D. COLMAN, LUTHER L. MILLER, AND HARRY A. SEVERSON, COPARTNERS AS BARBER-COLMAN COMPANY, OF ROCKFORD, ILLINOIS.

WINDER.

1,105,065.    Specification of Letters Patent.    Patented July 28, 1914.

Application filed December 22, 1909. Serial No. 534,435.

*To all whom it may concern:*

Be it known that I, HOWARD D. COLMAN, a citizen of the United States, residing at Rockford, in the county of Winnebago and State of Illinois, have invented certain new and useful Improvements in Winders, of which the following is a specification.

In textile mills the preparation of a warp involves the unwinding of the yarn from cops or bobbins onto spools, and the unwinding of the yarn from the spools onto a beam.

Generally stated, the purpose of this invention is to dispense with the spooling operation, and wind the yarn directly from the bobbins onto the beam.

The number of threads wound upon a beam is considerable, hence a large number of bobbin supports must be provided if the threads are to be wound directly upon the beam. In order to economize in manual labor and in space, it is imperative that these bobbin-supports be compactly arranged, but, on the other hand, the bobbin-supports must be so disposed that individual bobbins and the strands extending therefrom shall be readily accessible to the operatives, the strands should be prevented from tangling, and the bobbins and strands should be so arranged that they shall not accumulate lint and other foreign matter.

The object of the invention is to produce a bobbin-supporting means or creel that shall fulfil the practical requirements above outlined.

A winder embodying my invention comprises a machine commonly called a warper and an apparatus which will be hereinafter denominated a creel.

Fig. 10ª is a fragmental view similar to Fig. 10, but showing the bobbin cluster in another position.

Figure 1:
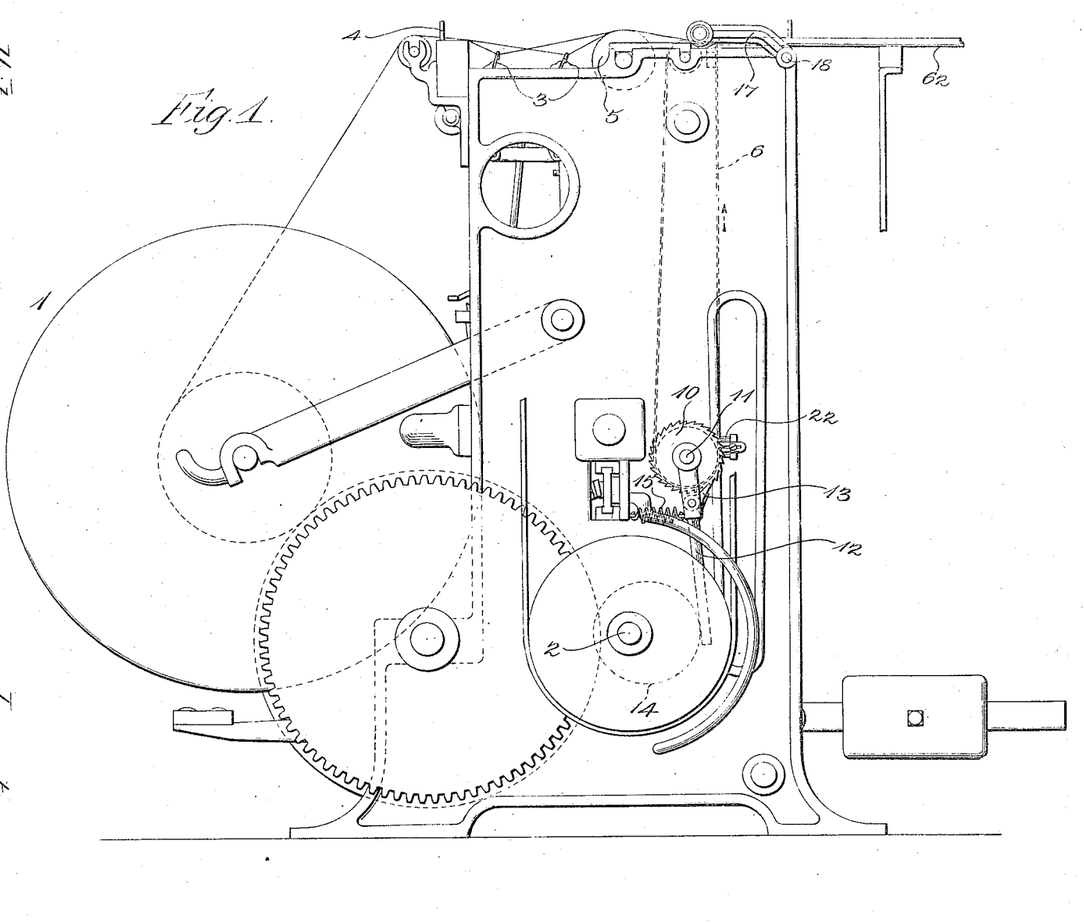
Figure 1 of the accompanying drawings is a side elevation of a warper and Fig. 2 a fragmental side elevation of a creel which may be used in carrying out the invention.
Figure 2:
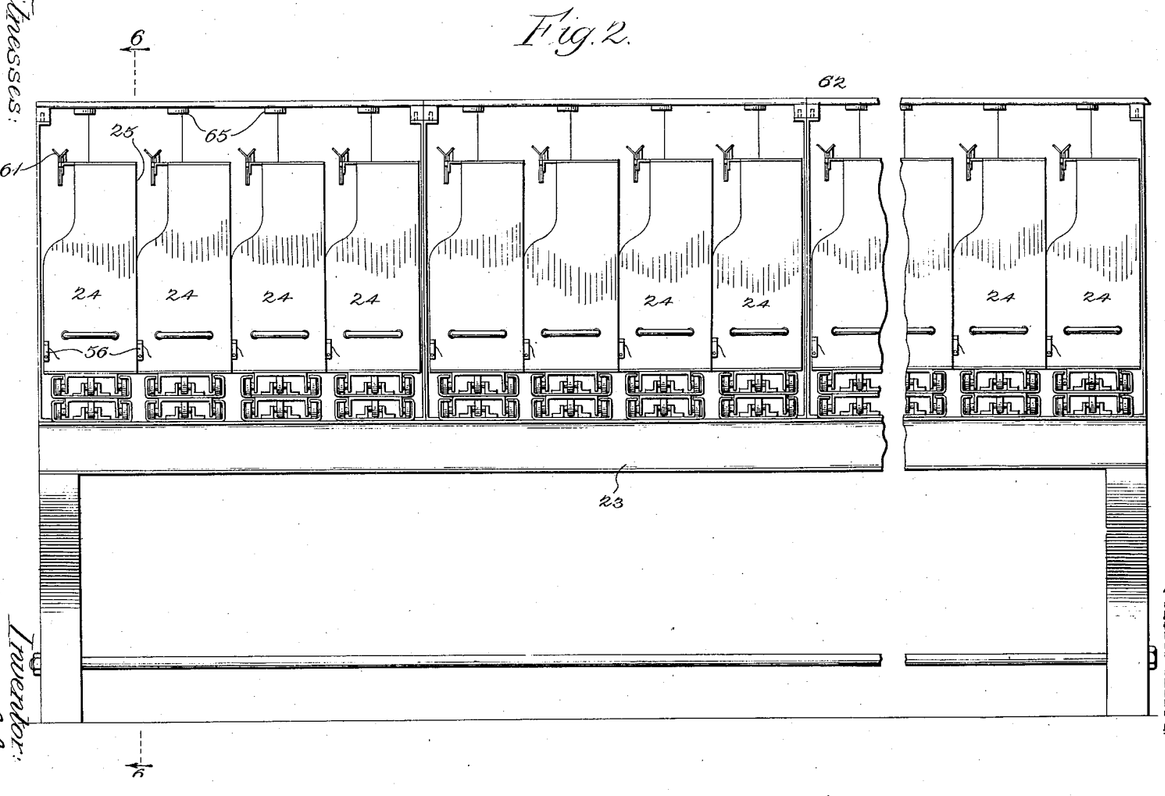
Figure 17:
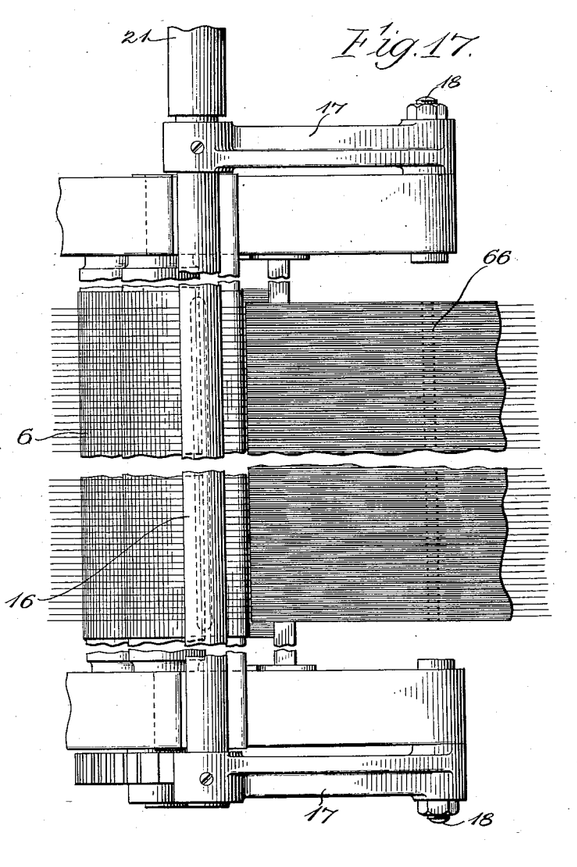
Fig. 17 is a fragmental top plan view of the thread-tensioning and cleaning means.
Figure 18:
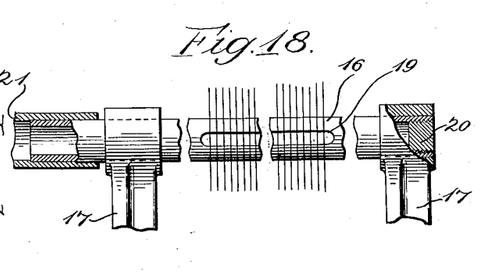
Fig. 18 is a detail view of a member comprised in said means.

The warper which has been selected for illustration herein comprises means for rotatably supporting a beam 1, a drive shaft 2, and suitable connections for transmitting motion from the drive shaft to the beam. Any preferred mechanism may be provided for automatically stopping the warper upon the breakage of a thread, said mechanism in this instance including drop wires 3. Forward of the drop wires is an expansible comb 4 through which the threads run, and by means of which the threads may be properly spaced on the beam. Rearward of the drop wires the yarn passes over a measuring roll 5, and rearward of said roll is located a tensioning mechanism. One form of tensioning mechanism which may be used with this invention is illustrated in detail in Figs. 16, 17 and 18. It comprises an endless apron 6 of canvas or other suitable flexible material, said apron being of sufficient width to underlie and support the sheet of threads being wound. Said apron extends over two rollers 7 and 8 and across a bar 9. Preferably the apron 6 is positively moved, the means herein shown for moving it consisting of a ratchet wheel 10 (Fig. 1) fixed upon the shaft 11 of the roller 8, an arm 12 loose on the shaft 11 and carrying a pawl 13 engaging the ratchet wheel, a cam 14 on the shaft 2, and a spring 15 holding the arm 12 in contact with the cam, although it is apparent that the apron may be moved constantly by suitable mechanism instead of intermittently, if desired.

The sheet of threads extends between a member 16 and that portion of the apron which lies between the bar 9 and the roller 7. The member 16 is attached to two arms 17 which are hinged to the frame of the machine at 18, and by its weight the member 16 holds the sheet of threads against the apron. In order, however, to insure uniform tension upon all of the threads, means is provided for drawing the apron against the member 16. To this end the member 16 is in the form of a tube and has a longitudinal slot 19 in its lower side of such length as to extend from one side of the sheet of threads to the other. One end of the tube 16 is closed by a plug 20 (Fig. 18), while the other end is connected by suitable means, as a hose 21, with a suction pump (not shown) or any other preferred means for creating an exhaust air current in said tube. When a suction pump is employed for that purpose, a dust collector of some form should be inserted between the suction pump and the tube. By reason of said air current all portions of the width of the apron 6 are held with uniform pressure against the tube 16, thereby placing tension upon the individual threads. The air current serves also to remove dust, lint and other foreign matter from the threads as they pass beneath the tube 16. The threads travel much faster than the apron 6, hence some of the foreign matter carried by the threads is rubbed off. A portion of the dirt thus loosened is removed by the air current, while another portion is carried away by the apron, from whence it is removed by a suitable means, such as a stationary brush 22 contacting the apron. Of course, a rotary brush, with means for driving it, may be provided in place of the stationary brush if a rotary brush is desirable.

The suction tube 16 may be lifted off the apron when it becomes necessary to pass a thread through the tensioning mechanism.

The movability of the apron serves to prevent localized wear of the apron due to the friction of the threads.

Figure 7:
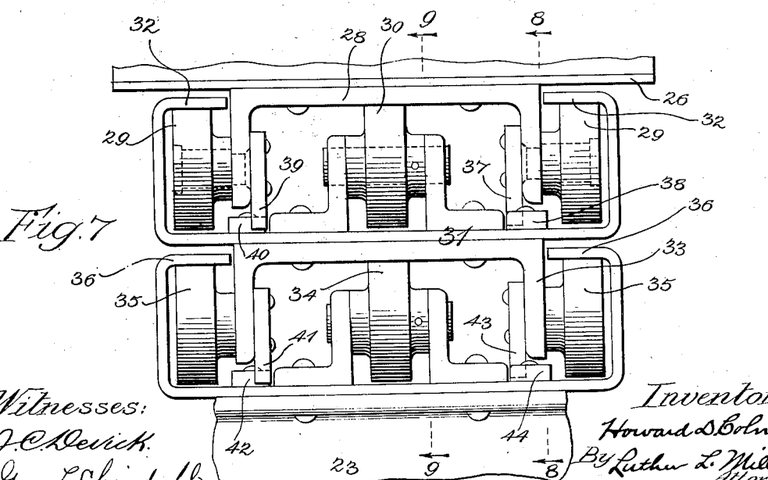
Fig. 7 is an end view of one of the extension slides upon which the movable sections of the creel are supported.
Figures 8, 10A:
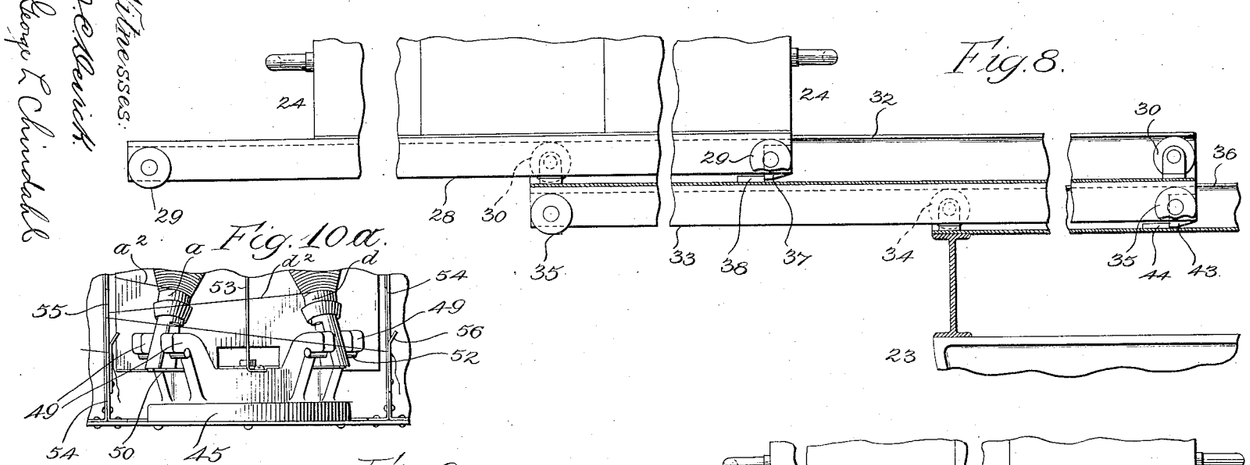
Figs. 8 and 9 are sections on lines 8—8 and 9—9, respectively, of Fig 7.
Figure 9:
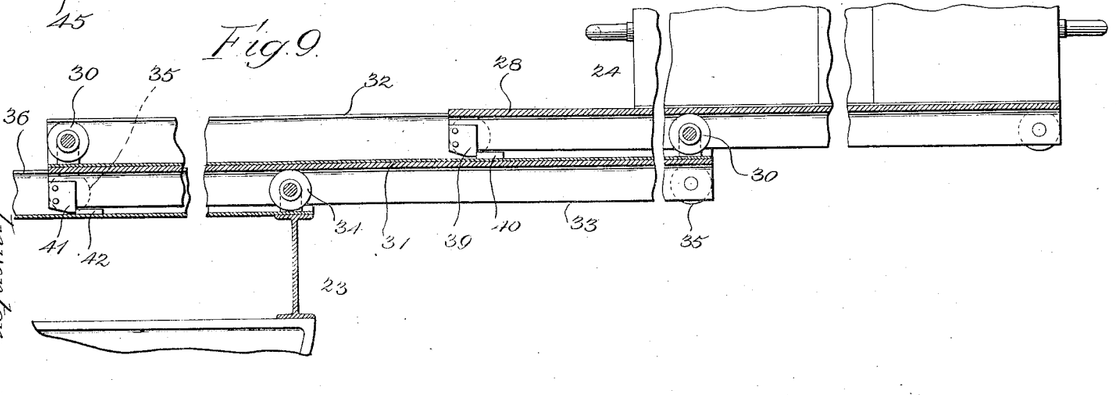

The creel illustrated in the present drawings comprises an elongated, relatively low supporting frame 23 arranged with one of its ends adjacent to the rear side of the warper. Upon the top of said frame are placed the bobbin-supports, said supports being accessible to the operative from the sides of the creel. Above the bobbin-supports and carried by the frame 23 is stationary means for guiding the threads extending from the bobbins to the warper. In order that the bobbin-supports may occupy a minimum amount of space and yet be readily accessible to the creel operative, the bobbin-supports are divided in groups, the groups being compactly arranged side by side, and each group being withdrawable from its usual place among the groups in order that the members of any group may be inspected and handled by the creel operative. The parts are so arranged that the withdrawal of a group from its normal position does not interfere with the unwinding of the bobbins in said group. The structure by means of which each group of bobbin-supports is thus movably supported will be hereinafter termed a drawer. As shown in Figs. 2, 3, 10 and 11, each drawer 24 consists of an elongated case having closed ends, a closed forward side 25, an open rear side, a bottom wall 26 and a top wall 27. The drawers 24 are mounted for longitudinal movement, the direction of drawer movement being transverse of the creel. Each drawer is longitudinally movable in either direction out of its normal position, so that the creel operative may have access to its contents at whichever side of the creel he may happen to be; and in order that each drawer 24 may be withdrawn far enough to afford access to all the bobbin spindles therein, it is supported upon an extension slide constructed in this instance as follows:

Referring to Figs. 7, 8 and 9: A channel bar 28 is fixed to the bottom of each drawer, and carries upon the outer sides of its flanges four rollers 29. The channel bar 28 runs upon a roller 30 fixed at each end of a slide 31, said slide having two rails 32 with which the rollers 29 make underrunning contact. The slide 31 comprises a channel bar 33 supported on rollers 34 at the edges of the frame 23. Upon the outer sides of the flanges of the channel bar 33 are mounted two pairs of rollers 35 adapted to run in contact with the lower sides of rails 36 fixed to the frame 23. Relative movement in one direction between the drawer 24 and the slide 31 is limited by coöperating stops 37 38 fixed to the drawer and the slide, respectively, while relative movement in the opposite direction is limited by similar stops 39 40. Stops 41 42 43 44 limit relative movement between the slide 31 and the frame of the creel. Each drawer 24 contains a suitable number of bobbin-supports. While these supports may be of any preferred construction, they are herein shown as consisting of clusters of bobbin spindles, there being four spindles in each cluster. The construction of the clusters is best shown in Figs. 10 to 13

Figures 12, 13:
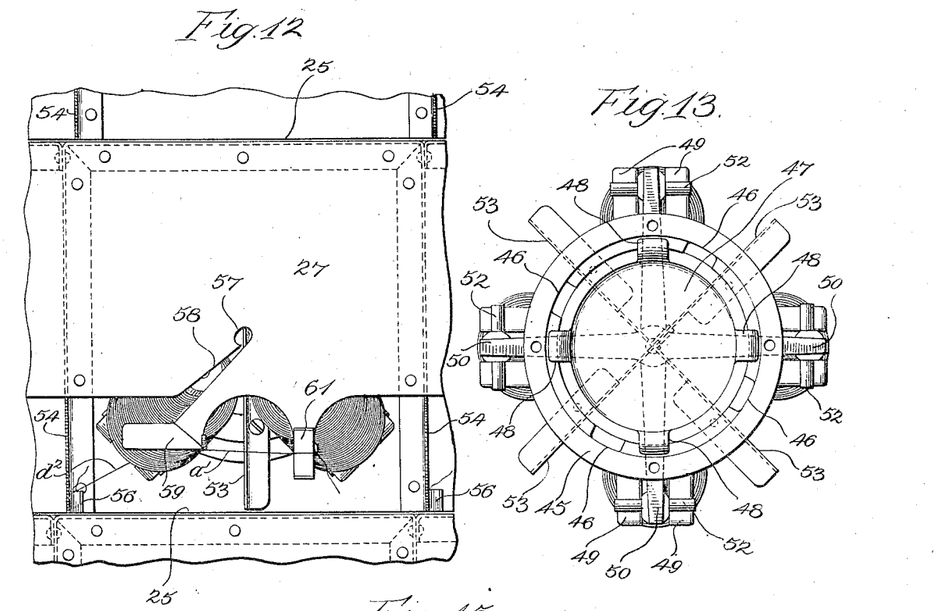
Fig. 12 is a fragmental top plan view of three creel-sections showing their relative arrangement.
Fig. 13 is an underside view of one of the clusters.

14, inclusive. Each is rotatably attached to the bottom of the drawer by means of a ring 45 fixed to said bottom, and having notches 46 (Fig. 13). A base 47 is adapted to rest on the ring 45 and has hooks 48 which are adapted to pass through the notches 46 and engage below the inturned flange of the ring when the base is given a partial rotation. Upon the base 47 are four pairs of lugs 49. Four springs 50 are fixed to the base 47 and extend between the lugs 49.

Each bobbin spindle 51 has its base portion pivotally mounted between two of the lugs 49 and has a pin 52 that lies in notches in the lower sides of said lugs, the pin being held in said notches by the spring 50 bearing upon the lower end of the spindle.

Figure 14:
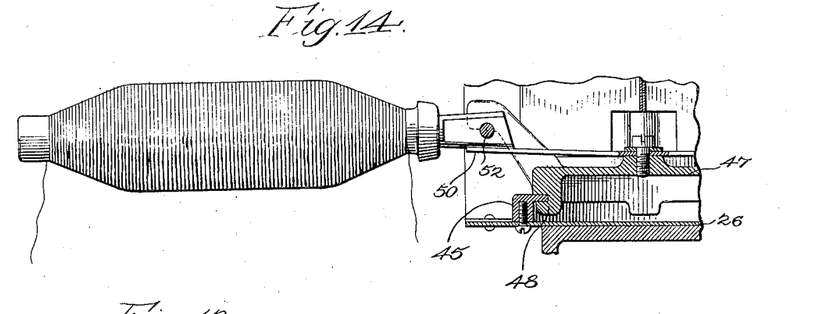
Fig. 14 illustrates the manner of placing a bobbin upon a spindle of the cluster.

In the top wall of the drawer is an eye through which extends the thread unwound from the bobbins of a cluster. The bobbin spindles 51 are all inclined so as to lie in a straight line extending from their pivotal supports to said eye, in which position they are releasably held by the springs 50. The springs will yield to permit the spindles to be swung by the creel operative into the position indicated in Fig. 14 for the insertion and removal of bobbins. Between the spindles 51 of each cluster are partitions 53. The clusters are located within individual compartments formed in the drawer by partitions 54.

Figures 10, 11:
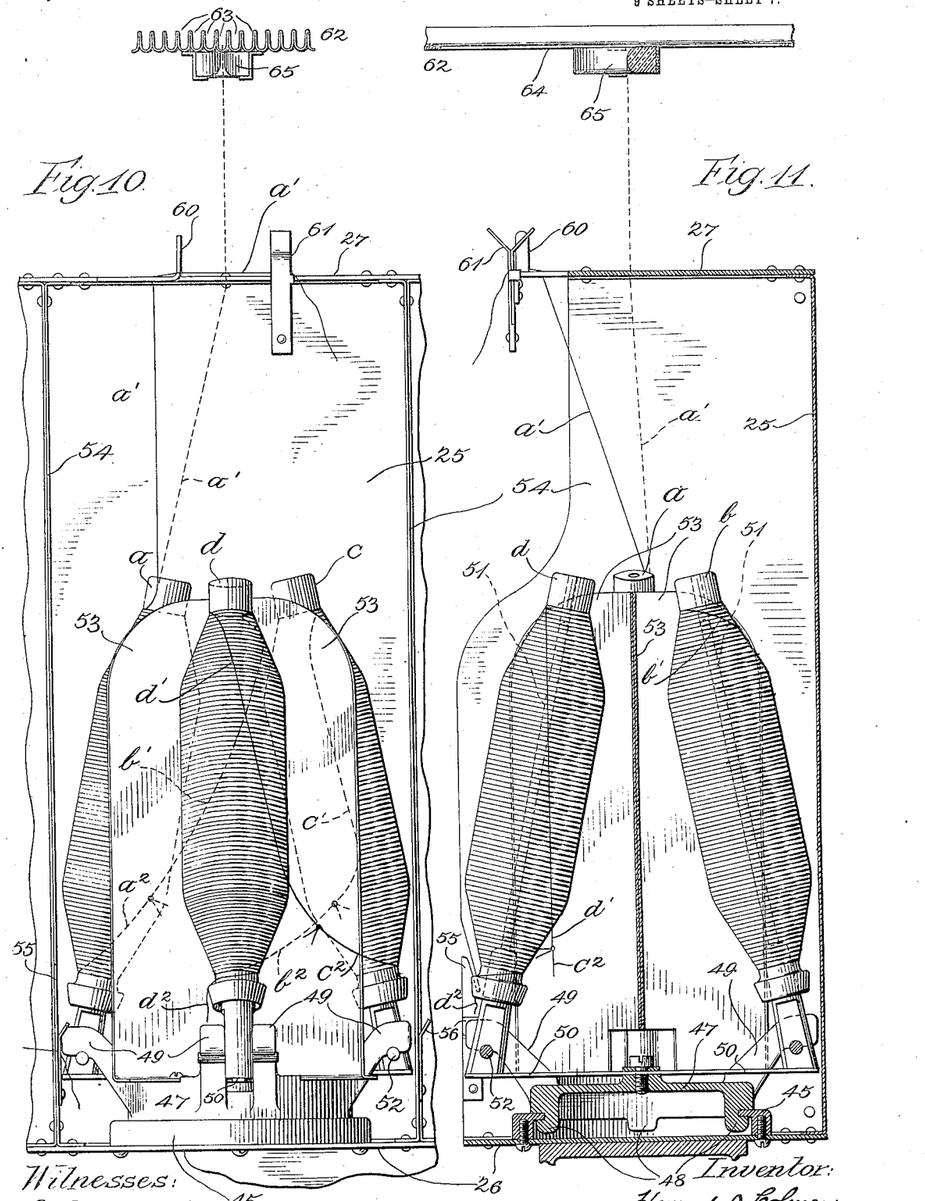
Fig. 10 is a fragmental side elevation of one of the movable creel-sections above referred to, showing one of the clusters of bobbin spindles contained in said creel-sections.
Fig. 11 is a transverse sectional view of the creel-sections and one of the clusters therein.

The threads upon the four bobbins of a cluster are tied together end to end by the operative so as to form a continuous thread, the bobbins being unwound successively. As shown in Figs. 10 and 11, the upper end $a'$ of the yarn on bobbin $a$ is the portion first unwound; the lower end $a^2$ on bobbin $a$ is connected to the upper end $b'$ on bobbin $b$; the lower end $b^2$ on bobbin $b$ is attached to the upper end $c'$ on bobbin $c$; and the lower end $c^2$ on bobbin $c$ is tied to the upper end $d'$ on bobbin $d$. The lower end $d^2$ on bobbin $d$ is passed around a hook 55 on one of the partitions 54 and thence carried to a spring clamp 56 on the opposite partition 54.

In the upper wall 27 of each compartment is a centrally located eye 57 through which the thread passes during winding. A slot 58 extends from the eye 57 to the rear edge of the top wall 27. At the entrance end of said slot and at the left-hand side (Fig. 12) of the eye 57 is a hook 59 having thereon an upwardly extending lug 60, while at the right-hand side of the eye is a spring clamp 61. Preparatory to putting a cluster in use, the end $a'$ is passed through the slot 58, laid across the hook 59 and behind the lug 60 and secured in the clamp 61.

Figure 15:
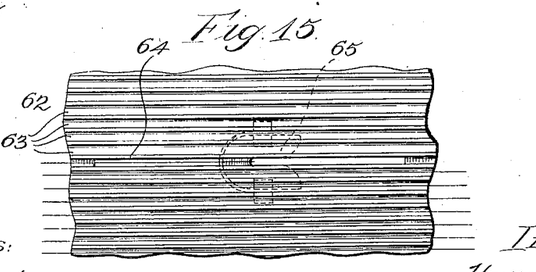
Fig 15 is a fragmental top plan view of the thread-guiding means located above the movable creel-sections.
Figure 16:
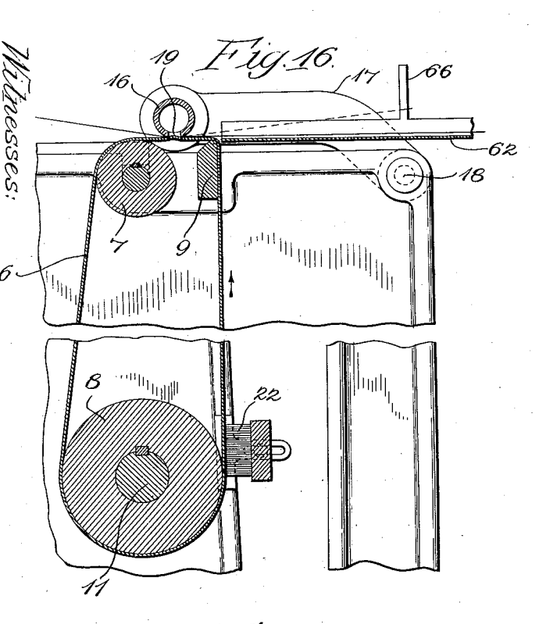
Fig. 16 is a sectional view of the thread-tensioning and cleaning means.

The means for guiding the yarn from the eyes 57 to the warper comprises, in this instance, a table 62 secured to the frame of the creel and overlying the drawers 24. The forward end of said table is extended to a point close to the tensioning mechanism, as shown in Fig. 16. The table 62 may be constructed in any suitable way. In said table are formed longitudinally extending thread grooves 63 (Figs. 10 and 15), one groove being provided for each thread that the creel is adapted to handle. Extending through the bottom of each groove is an opening 64 located in position to register with an eye 57, so that a thread may extend through said eye and said opening and be drawn through the groove and into the warper. To enable the operative to insert an implement in the opening 64 and pick up a thread extending between the hook 59 and the clamp 61, said opening is in the form of a slot, as shown in Figs. 11 and 15. A thread thus picked up moves through the slot 58 into the eye 57.

The end of the slot 64 through which the thread leaves may be reinforced by a member 65 of glass or other suitable hard and smooth material, said member also serving to prevent abrasion of the thread.

Figure 5:
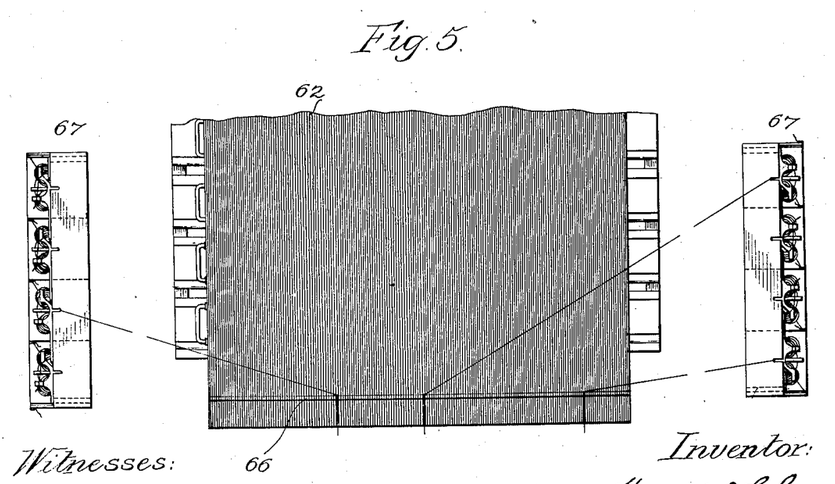
Fig. 5 is a top plan view representing the manner of using said auxiliary creels.
Figure 6:
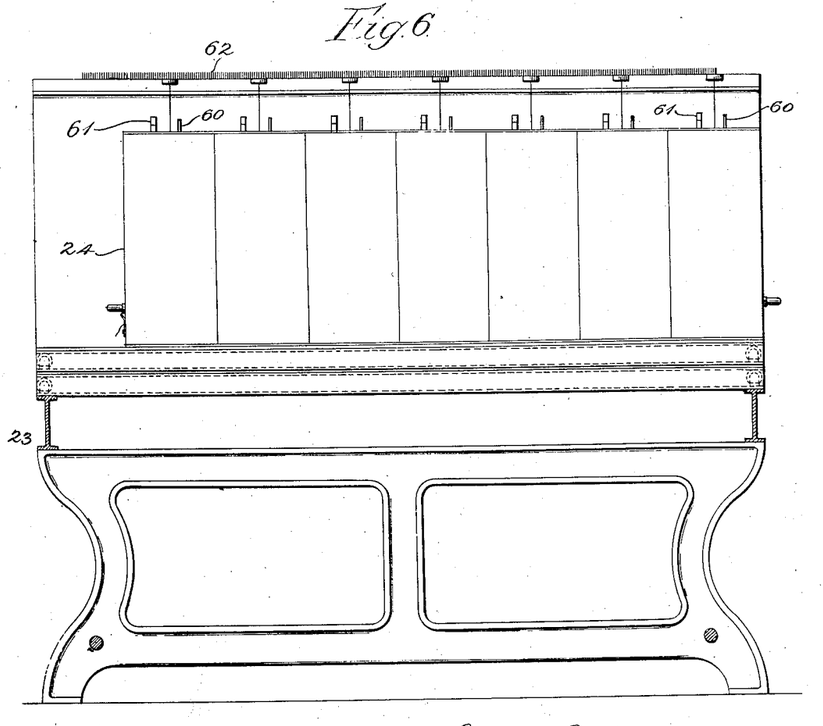
Fig. 6 is a sectional view taken in the plane of dotted line 6—6 of Fig. 2.

At the forward end of the table 62 is a spacing comb 66 (Figs. 5 and 16).

Figure 3:
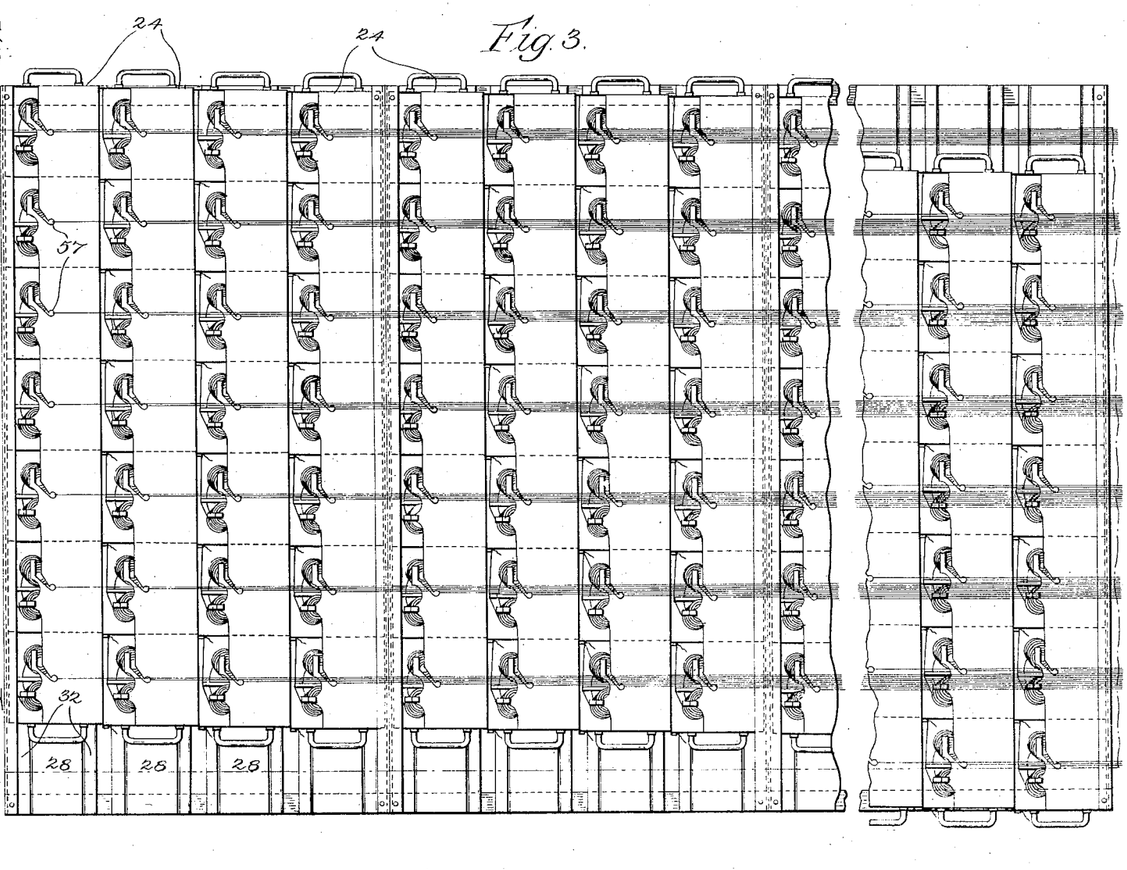
Fig. 3 is a fragmental top plan view of the creel. In this view the thread-guiding table is omitted, its outlines, however, being indicated by dot-and-dash lines.
Figure 4:
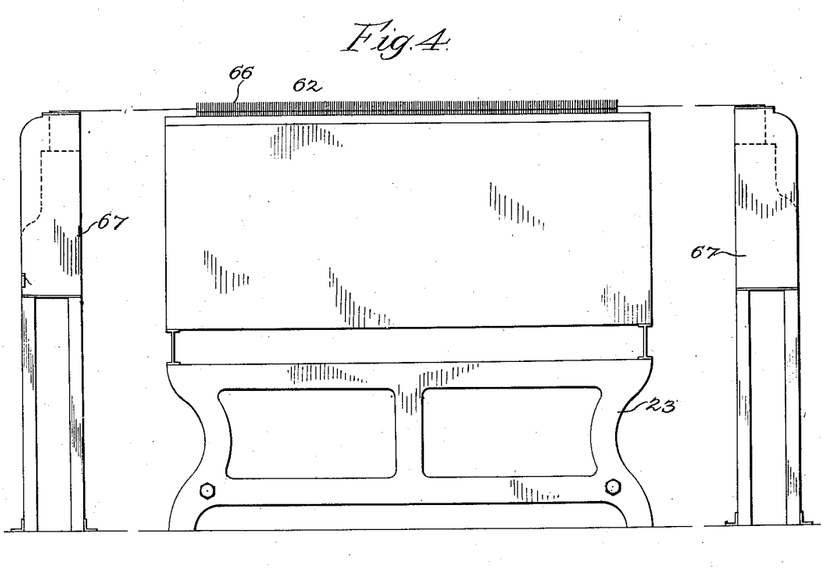
Fig. 4 is a front end elevation of the creel, showing also two auxiliary creels for reserve bobbins.

A drawer 24 may be entirely withdrawn from its place between two other drawers without interfering with the movement of the yarn through the eyes 57 in said drawer and through the corresponding openings 64 in the table. In order, however, that the yarn may run as freely as possible when the drawer occupies its normal position, the drawers are preferably so arranged that in their normal position they are progressively offset with relation to each other, so as to place the eyes 57 directly under the openings 64. To this end the drawers are secured to the channel bars 28 as shown in Fig. 3.

Occasionally a thread being wound will break, and to obviate the necessity for locating at the time the cluster whose thread has broken, I provide auxiliary bobbin-supports arranged in position for convenient manipulation by the creel operative and the warper operative. These auxiliary bobbin-supports may consist of two stationary creels 67 each generally similar to one of the drawers 24, and arranged one at each side of the main creel and adjacent to the warper. The creels 67 are, of course, far enough away from the main creel to permit of pulling the adjacent drawers 24 out to their full extent. Each creel 67 contains a suitable number of compartments containing clusters of bobbin spindles similar to the clusters in the drawers 24, and each compartment is provided with thread-holding devices similar to the parts 55 56 59 60 61.

Assuming the desired number of clusters to be supplied with bobbins, and the threads from the clusters extending through the eyes 57, the openings 64 and the grooves 63 to and through the warper to the beam 1, the operation is as follows:

The creel operative keeps the clusters supplied with bobbins by pulling out the drawers 24 and replacing any empty bobbins therein with full bobbins. In replacing bobbins, the creel operative releases the end $d^2$ from the clamp 56, turns the cluster to bring the empty bobbin to the open rear side of the compartment, swings the bobbin into the position shown in Fig. 14, pulls off the empty bobbin, puts a full bobbin on the spindle, swings the spindle into its normal position, ties the upper end of the yarn on the new bobbin to the end $d^2$, turns the cluster to place the bobbins in the corners of the compartment as shown in Fig. 12, and carries the lower end of the yarn on the new bobbin around the hook 55 and into the clamp 56. The various steps of the cluster-replenishing operation are substantially the same whether one, two or three bobbins are replaced.

Forwardly of the tensioning mechanism, the threads are subject to tension due to the tensioning mechanism and to whatever friction may be caused by the unwinding and their passage through the eyes 57 and the openings 64, while rearwardly of said mechanism the only tension upon the threads is that due to said friction. Thread breakages are relatively infrequent, but of those that do occur the major portion happen in the region of greater tension, to wit, forward of the tensioning mechanism, where the warper operative can readily take care of them.

In remedying a break, if the bobbin end be forward or adjacent to the tensioning mechanism, the warper operative picks up the bobbin end, draws it forward and ties it to the broken thread-end upon the beam. If the bobbin end be too far back to be readily located by the warper operative, he takes an end from one of the auxiliary creels, passes it through the appropriate space in the comb 66 and through the tensioning mechanism, and ties it to the broken thread upon the beam as before. The creel operative opens the drawers of the creel in rotation and replaces the one or more empty bobbins upon each cluster with filled bobbins, tying the thread ends of the bobbins together as hereinbefore specified. The free end of the thread on the first bobbin, or in the case of a broken thread, the free broken end, is placed by the operative upon the hook 59 and in the clamp 61.

When all the auxiliary clusters have been put into use the warper operative stops the warper, and inserting a suitable hook through the proper slot 64, engages the thread end placed in the clamp 61 by the creel operative for that purpose and pulls said end through the slot. This operation is repeated until a number of threads have been gathered, whereupon the operative carries all of said thread ends forward toward the warper and ties each thread to the reserve thread that has been running in its place from the auxiliary cluster. The ends of the reserve threads are then replaced upon the auxiliary clusters in position to be taken by the operative when another running thread breaks.

Two or more creel operatives may be employed, if desired, and in such case each operative attends to a certain specified section of the creel.

The drawers may be withdrawn at any time, but should not be replaced when the warper is not running, otherwise slack will occur in the threads and will be likely to kink and tangle when the warper starts.

I have provided clusters of four bobbins instead of a lesser number in order to enable the operative to supply each cluster with two or more bobbins at each serving, thereby avoiding the frequent handling of the drawers.

When a relatively small number of threads is to be wound, the comb 4 is expanded so as to lay the threads properly on the beam, and only the required number of clusters is supplied with bobbins, those clusters being placed in use which will permit of the threads being spaced upon the table 62 as nearly like the spacing in the comb as is conveniently possible.

It will be seen that in the creel herein shown the bobbins are arranged very compactly and yet are readily accessible to the creel operative. An advantage of the cluster arrangement herein shown is that all of the clusters are located at a convenient height.

It will also be noted that the strands are kept entirely separate from one another, thereby preventing tangling and facilitating the handling of the threads. Moreover, the strands are all in the same horizontal plane, hence dirt cannot fall from one thread onto another. The advantage just mentioned is found also in the bobbin arrangement, all of the clusters being in one horizontal plane.

I would have it understood that the invention is not limited to the details herein described, for various modifications will occur to persons skilled in the art.

I claim as my invention:

1. A creel comprising bobbin-supports divided into groups, one of said groups being slidably withdrawable from its normal position among the groups, and means for guiding running threads extending from said group when in either of its positions.

2. A creel comprising a reciprocable bobbin-support, thread-guiding means reciprocable with said support, and a stationary guide for a thread extending from the reciprocable guiding means.

3. The combination, with a cluster of bobbin spindles, of partitions between the spindles to separate the running thread of one bobbin from the other bobbins.

4. In a creel, a bobbin support; a yarn guide above said support; a thread-clamp adjacent to said guide; and means for guiding a thread from the clamp to said guide.

5. A creel comprising a plurality of supports which are slidably mounted for movement with relation to each other, a plurality of bobbin-spindle clusters on each of said supports, and means slidable with each support for guiding threads extending from the clusters.

6. A creel comprising a plurality of drawers, a plurality of bobbin-spindle clusters in each of said drawers, and means attached to each drawer for guiding threads extending from the clusters.

7. A creel comprising an elongated frame, groups of bobbin-supports carried by said frame, said groups being longitudially movable transversely of said frame, and means connected to and moving with each group for guiding threads extending from the bobbin-supports.

8. A creel comprising an elongated frame, and groups of bobbin-supports carried by said frame, said groups being longitudinally movable transversely of said frame and to either side of the frame.

9. A creel comprising an elongated frame, a plurality of drawers carried by said frame, said drawers being longitudinally movable transversely of the frame, a plurality of bobbin-supports in each of said drawers, and means attached to each drawer for guiding threads extending from the bobbin-supports.

10. A creel comprising a frame, a plurality of drawers arranged in a single horizontal plane on said frame, a plurality of bobbin-supports in each of said drawers, and means attached to each drawer for guiding threads extending from the bobbin-supports.

11. A creel comprising a frame, a plurality of elongated drawers arranged for longitudinal movement transversely of the frame, and a plurality of bobbin-supports in each drawer, each drawer having an open side through which access may be had to the bobbin-supports.

12. A creel comprising an elongated frame, a plurality of drawers arranged side by side in a single horizontal plane on said frame, an extension slide device upon which each drawer is mounted and by means of which the drawer may be moved to either side of the frame, and a plurality of bobbin-supports in each of said drawers.

13. The combination of a warper, a main creel, and an auxiliary creel arranged relatively near the warper.

14. A thread-guiding means for creels comprising a structure having individual openings for the threads to be wound and individual grooves each communicating with one of said openings, and each adapted to contain and guide a thread.

15. The combination of a warper, bobbin-supports, and thread-guiding means comprising means for partitioning off each thread from all the other threads during its travel from the bobbin-supports to the warper.

16. The combination of a warper, bobbin-supports, and a grooved structure extending from the bobbin-supports to the warper, the grooves of said structure receiving and guiding individual threads.

17. A thread-guiding means for creels comprising a table having a plurality of thread-admitting openings therethrough, and a groove extending from each of said openings to one end of the table.

18. A creel comprising a horizontally arranged body of bobbin-supports and a superposed horizontally-arranged table having thread-receiving openings in operative relation with the bobbin-supports, and a groove communicating with each of said openings for receiving and partitioning off each thread from all the other threads.

19. The combination, with a warper having a tensioning mechanism, of an elongated creel arranged with one of its ends adjacent to the warper, the bobbin-supports of said creel being arranged in a horizontal plane, and an elongated horizontally-arranged table superposed upon the creel and having one of its ends arranged adjacent to the tensioning mechanism, said table being grooved for the reception of the individual threads being wound.

20. The combination, with a cluster of bobbin-spindles, of guide means for the thread to be unwound, and means adjacent to said guide means for supporting a length of the thread preparatory to the unwinding operation.

21. The combination with a cluster of bobbin-spindles, of a part located above the cluster and having therein an eye for the thread to be unwound and a slot leading to said eye, and means for supporting at two points a thread extending through said slot.

22. In a creel, an elongated box-like structure, one long vertical side of which is open, and bobbin-supports within said structure, and mounted upon the bottom thereof, said structure having thread-guiding means above the bobbin-supports.

23. In a creel, an elongated box-like structure, one long vertical side of which is open, bobbin-supports within said structure and mounted upon the bottom thereof, and a thread-end holder on the top wall of said structure, said wall having a yarn-guiding opening therein above each bobbin support and an open-end slot extending from the edge of said wall to said opening.

24. In a winder, bobbin supports, means for supporting and rotating a warp beam to which threads from the bobbins extend, and a table located intermediate the bobbin supports and the beam-supporting and rotating means, said table having grooves therein to receive and guide the threads.

25. In a creel, an elongated box-like structure; a series of bobbin supports extending longitudinally of and within said structure; and a series of thread guides connected to said structure and extending longitudinally thereof and above the series of bobbin supports.

26. In a creel, a bobbin support; a plate having a thread-guiding opening above said support; a thread-end holder on said plate; and a hook for guiding a thread to said holder, said plate having a slot extending from the hook to said guide-opening.

27. In a creel, a supporting structure; a bobbin support mounted on said structure; a plate above said bobbin support, said plate having a thread-guiding opening therein; and a thread-end holder and a hook on said plate, the latter having an open-end slot extending from the hook to said yarn-guiding opening.

28. The combination, with a warper, of an elongated creel arranged with one of its ends adjacent to the warper, the bobbin supports of said creel being arranged in a horizontal plane; and an elongated horizontally arranged table above the creel and having one of its ends adjacent to the warper, said table being grooved for the reception of the individual threads being wound.

HOWARD D. COLMAN.

Witnesses:
C. PAUL PARKER,
MATILDA M. DALEY.